US012773818B2

(12) United States Patent
Mitani

(10) Patent No.: US 12,773,818 B2
(45) Date of Patent: Oct. 27, 2026

(54) MOLD CLAMPING DEVICE AND INJECTION MOLDING MACHINE

(71) Applicant: THE JAPAN STEEL WORKS, LTD., Tokyo (JP)

(72) Inventor: Souma Mitani, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 471 days.

(21) Appl. No.: 18/338,455

(22) Filed: Jun. 21, 2023

(65) Prior Publication Data

US 2023/0415392 A1 Dec. 28, 2023

(30) Foreign Application Priority Data

Jun. 24, 2022 (JP) ................................ 2022-101507

(51) Int. Cl.
*B29C 45/66* (2006.01)
*B29C 45/76* (2006.01)

(52) U.S. Cl.
CPC .......... *B29C 45/66* (2013.01); *B29C 45/7653* (2013.01); *B29C 2045/667* (2013.01)

(58) Field of Classification Search
CPC . B29C 45/66; B29C 45/6728; B29C 45/7623; B29C 45/7653; B29C 2045/667; B29C 2045/76; B29C 2045/7653; B29C 2945/7623; B29C 2945/76234; B29C 2945/76224
See application file for complete search history.

(56) References Cited

U.S. PATENT DOCUMENTS

| | | | | |
|---|---|---|---|---|
| 4,741,685 A * | 5/1988 | Inaba | B29C 45/76 | 264/40.5 |
| 7,494,609 B2 * | 2/2009 | Tsuji | B29C 45/7653 | 264/40.5 |
| 7,690,915 B2 * | 4/2010 | Furutani | B29C 45/641 | 425/451.7 |
| 2009/0246306 A1 * | 10/2009 | Yoshida | B29C 45/76 | 425/150 |
| 2015/0197052 A1 * | 7/2015 | Hirose | B29C 45/7653 | 264/40.5 |

FOREIGN PATENT DOCUMENTS

| | | | |
|---|---|---|---|
| DE | 102012005268 B4 * | 5/2014 | B29C 45/7653 |
| JP | 5-269748 A | 10/1993 | |
| JP | 2003 33954 A | 2/2003 | |
| JP | 7089013 B1 | 6/2022 | |

OTHER PUBLICATIONS

Communication dated Dec. 16, 2025 issued by the Japan Patent Office in Japanese Patent Application No. 2022-101507.

* cited by examiner

*Primary Examiner* — Thu Khanh T. Nguyen
(74) *Attorney, Agent, or Firm* — Sughrue Mion, PLLC

(57) ABSTRACT

A mold clamping device includes two mold platens; a plurality of ball screw mechanisms connecting the mold platens to each other; a plurality of servo motors respectively configured to drive the ball screw mechanisms; and a control device. The control device is configured to independently control the servo motors based on a plurality of axial force setting values respectively set for the plurality of ball screw mechanisms, and the plurality of axial force setting values are set in the control device based on a constraint condition defining an allowable range within which the axial force setting values are settable.

17 Claims, 4 Drawing Sheets

MOLD CLAMPING DEVICE AND INJECTION MOLDING MACHINE

CROSS-REFERENCE TO RELATED APPLICATIONS

This application is based on and claims priority under 35 USC 119 from Japanese Patent Application No. 2022-101507 filed on Jun. 24, 2022, the entire content of which is incorporated herein by reference.

TECHNICAL FIELD

The present disclosure relates to a mold clamping device including two mold platens and a plurality of ball screw mechanisms connecting the mold platens, and an injection molding machine.

BACKGROUND

An injection molding machine or a pressing machine is provided with a mold clamping device for clamping a mold. There are various types of mold clamping devices, and JPH5-269748A discloses a mold clamping device including two mold platens. That is, the mold platens include a fixed platen and a movable platen. The fixed platen and the movable platen are connected by four sets of ball screw mechanisms, and each of the four ball screw mechanisms is provided with a servo motor. Therefore, when the four servo motors are driven, the four sets of ball screw mechanisms are driven, and the movable platen slides with respect to the fixed platen. That is, the mold is opened and closed.

SUMMARY

In the mold clamping device described in JPH5-269748A, the four servo motors can be independently driven, and axial forces respectively acting on the four ball screw mechanisms can be independently controlled. Therefore, even when a mold is attached at a position where a center of the mold and a center of the mold platen are deviated from each other, a mold clamping force can be uniformly applied to the mold by adjusting the axial forces applied to the four ball screw mechanisms during mold clamping. However, problems to be solved are also found. Specifically, there is no restriction on a settable axial force, and an axial force that imposes a burden on a part of the ball screw mechanisms can also be set, which causes early deterioration of the ball screw mechanisms.

The present disclosure provides a mold clamping device that suppresses early deterioration of a ball screw mechanism.

Other problems and novel features will become apparent from description of the present description and the accompanying drawings.

Illustrative aspects of the present disclosure relate to a mold clamping device including two mold platens, a plurality of ball screw mechanisms connecting the mold platens to each other, a plurality of servo motors respectively provided on the plurality of ball screw mechanisms and configured to respectively drive the ball screw mechanisms, and a control device. The control device is configured to independently control the servo motors based on a plurality of axial force setting values respectively set for the plurality of ball screw mechanisms. The plurality of axial force setting values are set in the control device based on a constraint condition defining an allowable range within which the axial force setting values are settable.

According to the present disclosure, early deterioration of the ball screw mechanism can be suppressed.

DETAILED DESCRIPTION

Figure 1:
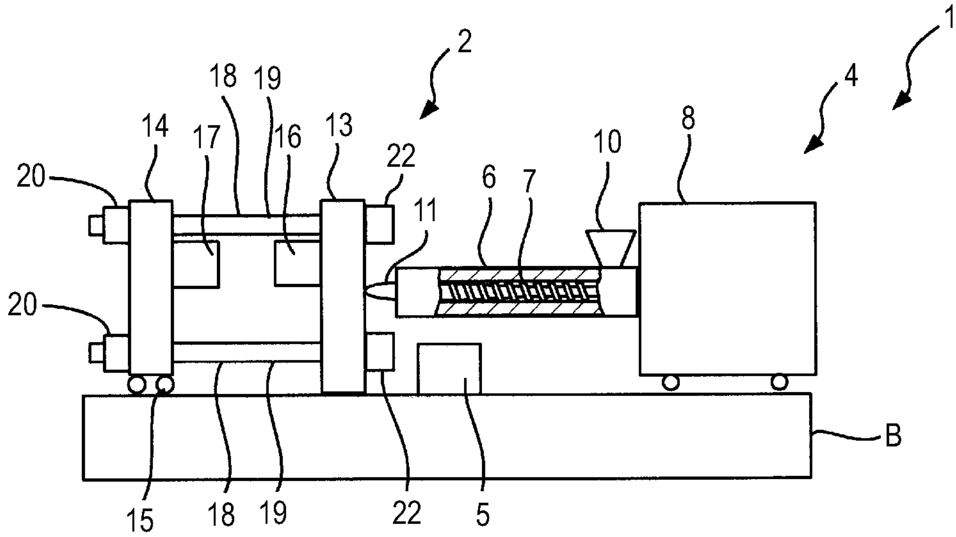
FIG. 1 is a front view showing an injection molding machine according to an illustrative embodiment.

Hereinafter, illustrative embodiments will be described in detail with reference to the drawings. The present disclosure is not limited to the following illustrative embodiment. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

Injection Molding Machine According to Present Illustrative Embodiment

As shown in FIG. 1, an injection molding machine 1 according to the present illustrative embodiment includes a mold clamping device 2 provided on a bed B, an injection device 4, and a control device 5 configured to control the mold clamping device 2 and the injection device 4.

{Injection Device}

The injection device 4 includes a heating cylinder 6, a screw 7 inserted in the heating cylinder 6, and a screw drive device 8 configured to drive the screw 7. The heating cylinder 6 is provided with a hopper 10. An injection nozzle 11 is provided at a tip end of the heating cylinder 6. When an injected material is fed from the hopper 10 and then is melted by rotating the screw 7, the injected material is metered at a tip end of the screw 7. When the screw 7 is driven in an axial direction thereof, the injected material is injected.

{Mold Clamping Device}

Figure 2:
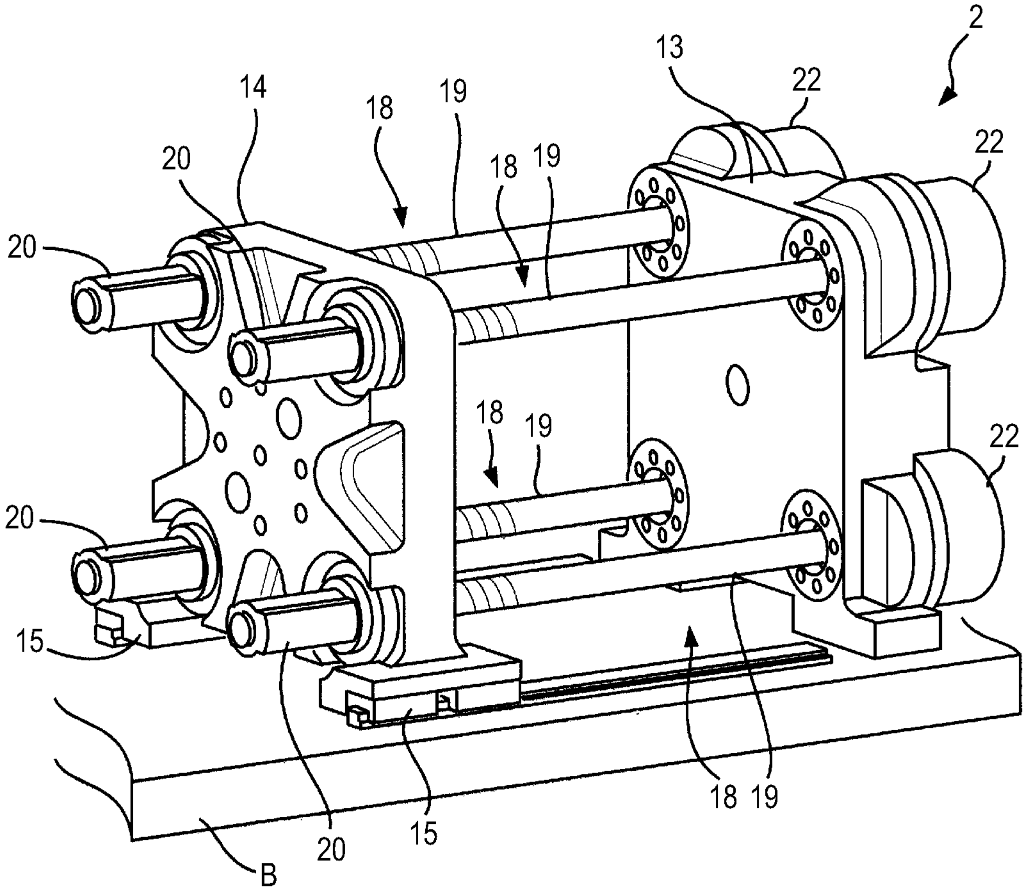
FIG. 2 is a perspective view showing a mold clamping device according to the present illustrative embodiment.

The mold clamping device 2 according to the present illustrative embodiment is a so-called two-platen mold clamping device. That is, as shown in FIG. 2, the mold clamping device 2 includes two mold platens 13, 14, that is, the fixed platen 13 and the movable platen 14. The fixed platen 13 is fixed on the bed B. The movable platen 14 is placed on linear guides 15, 15 provided on the bed B. That is, the movable platen 14 is slidable in directions approaching and separating from the fixed platen 13. As shown in FIG. 1, a fixed-side mold 16 is attached to the fixed platen 13, and a movable-side mold 17 is attached to the movable platen 14. The fixed-side mold 16 and the movable-side mold 17 are preferably provided at centers of the fixed platen 13 and the movable platen 14, respectively, but may be disposed at positions deviated from the respective centers of the mold platens. FIG. 1 shows a state in which the molds 16, 17 are disposed at positions deviated upward from the centers of the mold platens.

In the mold clamping device 2 according to the present illustrative embodiment, the two mold platens 13, 14, that is, the fixed platen 13 and the movable platen 14 are connected by four rod-shaped members, that is, four ball screw mechanisms 18, 18 . . . . The ball screw mechanisms 18, 18, . . . include ball screws 19, 19, . . . and ball nuts 20, 20, . . . attached to the ball screws 19, 19, . . . , respectively.

Although not shown in FIG. 2, through holes are formed in the movable platen 14, and the ball nuts 20, 20, . . . are fixed to the respective through holes. That is, one ends of the ball screws 19, 19, . . . are connected to the movable platen 14 via the ball nuts 20, 20, . . . . The other ends of the ball screws 19, 19, . . . penetrate the fixed platen 13 and are rotatably supported with respect to the fixed platen 13. Servo motors 22, 22, . . . are provided on the fixed platen 13 and are connected to the ball screws 19, 19, . . . , respectively. Therefore, when the servo motors 22, 22, . . . are driven, the ball screws 19, 19, . . . rotate and the movable platen 14 slides. That is, the molds 16, 17 (see FIG. 1) are opened and closed.

{Case where Axial Force Setting Value is Constant}

Figure 3:
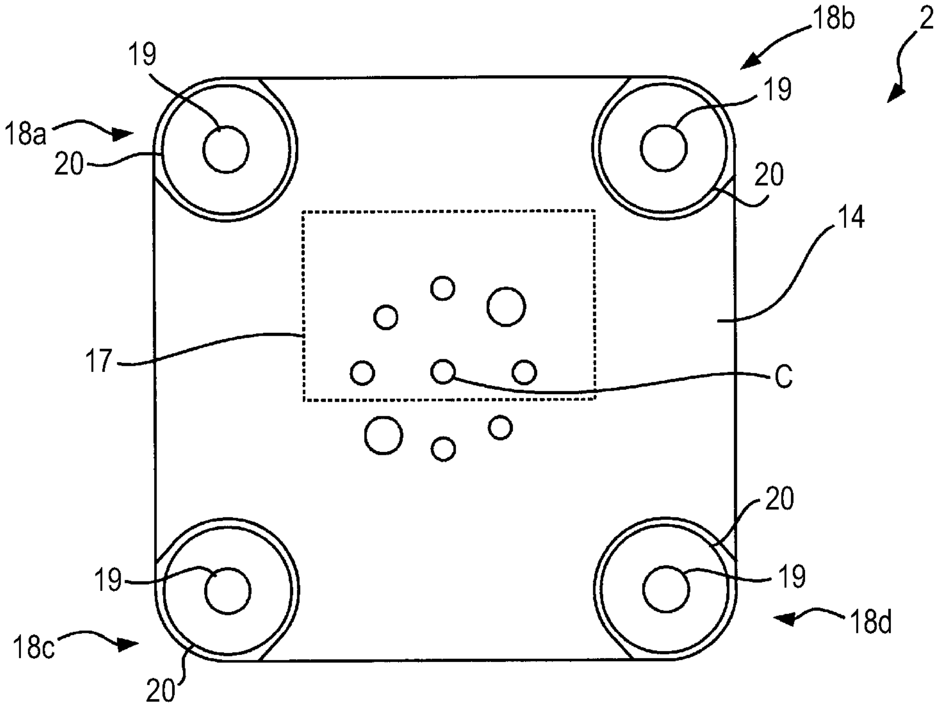
FIG. 3 is a plan view of a movable platen according to the present illustrative embodiment.
Figure 4:
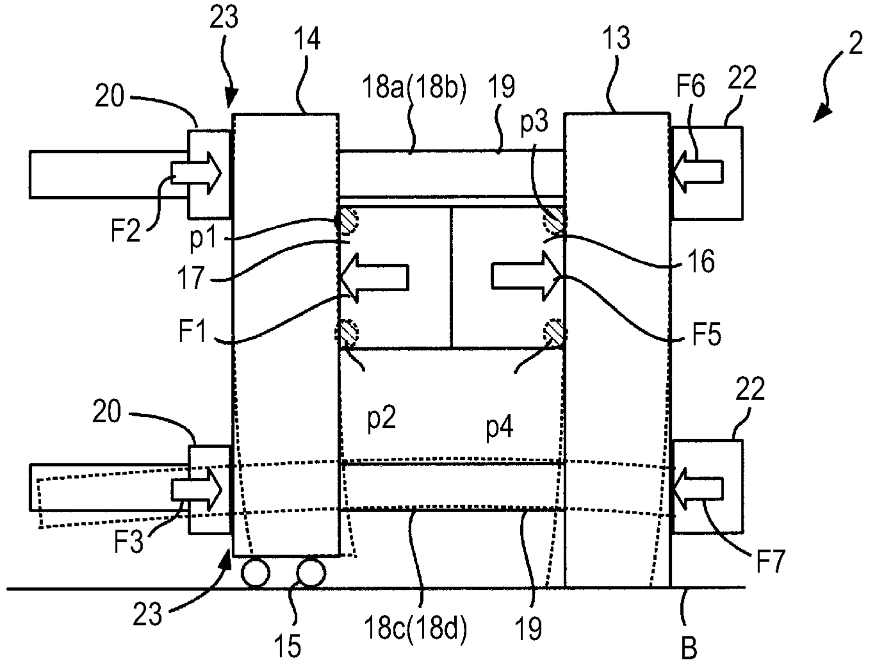
FIG. 4 is a front view of the mold clamping device according to the present illustrative embodiment.

In the injection molding machine 1 according to the present illustrative embodiment, the control device 5 (see FIG. 1) is configured to control the plurality of servo motors 22, 22, . . . , independently. Setting values for axial forces acting on the plurality of ball screw mechanisms 18, 18 . . . , that is, axial force setting values can be set for the respective ball screw mechanisms 18, 18, . . . . For example, the axial force setting values may be set as torque setting values for the respective servo motors 22, 22, . . . . The reason why the axial forces can be set independently for all the ball screw mechanisms 18, 18 . . . is to cause the mold clamping force to substantially uniformly act on the molds 16, 17. Here, control different from the present illustrative embodiment will be considered. In other words, what happens when only the same axial force setting value can be set for the ball screw mechanisms 18, 18, . . . will be examined. In FIGS. 3 and 4, the ball screw mechanisms 18, 18, . . . are respectively denoted by different reference numerals 18*a*, 18*b*, 18*c*, and 18*d* for convenience.

As shown in FIG. 3, the mold 17 is disposed on the movable platen 14 with being deviated upward from a center C of the movable platen 14. That is, the mold 17 is close to the ball screw mechanisms 18*a*, 18*b* and is separated from the ball screw mechanisms 18*c*, 18*d*. In this state, substantially the same axial force is applied to all the ball screw mechanisms 18*a*, 18*b*, 18*c*, and 18*d*. Then, as shown in FIG. 4, an axial force F2 acting on the movable platen 14 from the ball screw mechanisms 18*a*, 18*b* and an axial force F3 acting on the movable platen 14 from the ball screw mechanisms 18*c*, 18*d* have substantially the same magnitude. On the other hand, a force F1 acts on the movable platen 14 from the mold 17. Since a distance between a point of action of the force F1 and a point of action of the axial force F3 is longer than a distance between the point of action of the force F1 and a point of action of the axial force F2, a bending moment that is stronger on a lower side than an upper side acts on the movable platen 14. Accordingly, the movable platen 14 is slightly deformed as indicated by a dotted line, and the degree of deformation is larger on the lower side.

Similarly, when an axial force F6 and an axial force F7 are applied to the fixed platen 13, a force F5 is applied from the mold 16, and the fixed platen 13 is slightly deformed as indicated by a dotted line. When the movable platen 14 and the fixed platen 13 are deformed in this manner, a distance between the movable platen 14 and the fixed platen 13 is slightly narrowed in a downward direction. Thus, in the molds 17, 16, a stronger force acts on portions indicated by reference numerals p2, p4 than on portions indicated by reference numerals p1, p3. As a result, the mold clamping force acting on the molds 16, 17 becomes nonuniform.

{Setting of Different Axial Force Setting Values}

The control device 5 (see FIG. 1) of the injection molding machine 1 according to the present illustrative embodiment is configured to set different axial force setting values for the four ball screw mechanisms 18, 18, . . . . For example, referring to FIG. 3, a slightly larger axial force setting value can be set for the ball screw mechanism 18*a* and the ball screw mechanism 18*b*, and a slightly smaller axial force setting value can be set for the ball screw mechanism 18*c* and the ball screw mechanism 18*d*. In this way, the deformation as indicated by the dotted lines in FIG. 4 hardly occurs, and the mold clamping force can be uniformly generated in the molds 16, 17.

When the axial force setting values that can be set for the respective ball screw mechanisms 18*a*, 18*b*, 18*c*, and 18*d* are not restrained and the respective ball screw mechanisms 18*a*, 18*b*, 18*c*, and 18*d* are not protected, unfavorable setting may also be possible. For example, the axial force setting values may be set such that, due to an operation error in the control device 5 (see FIG. 1), an excessive axial force setting value is set for the ball screw mechanisms 18*a*, 18*b*, and an axial force that is substantially zero is set for the ball screw mechanisms 18*c*, 18*d*. Thus, an excessive load may be applied to the ball screw mechanisms 18*a*, 18*b*, resulting in early deterioration. The axial force setting values having large differences between one another are also intentionally set for the ball screw mechanisms 18*a*, 18*b*, 18*c*, and 18*d* without being limited to the operation error, a load on a part of the ball screw mechanisms 18*a*, 18*b*, 18*c*, and 18*d* similarly increases, which may cause early deterioration.

In the injection molding machine 1 (see FIG. 1) according to the present illustrative embodiment, a constraint condition is provided for the axial force setting values set for the respective ball screw mechanisms 18*a*, 18*b*, 18*c*, and 18*d* so as to restrict a settable range. Thus, the ball screw mechanisms 18*a*, 18*b*, 18*c*, 18*d* are protected. An axial force setting value inspection method according to the present illustrative embodiment performed in the control device 5 and a constraint condition applied in the inspection method will be described.

{Axial Force Setting Value Inspection Method}

Figure 5:
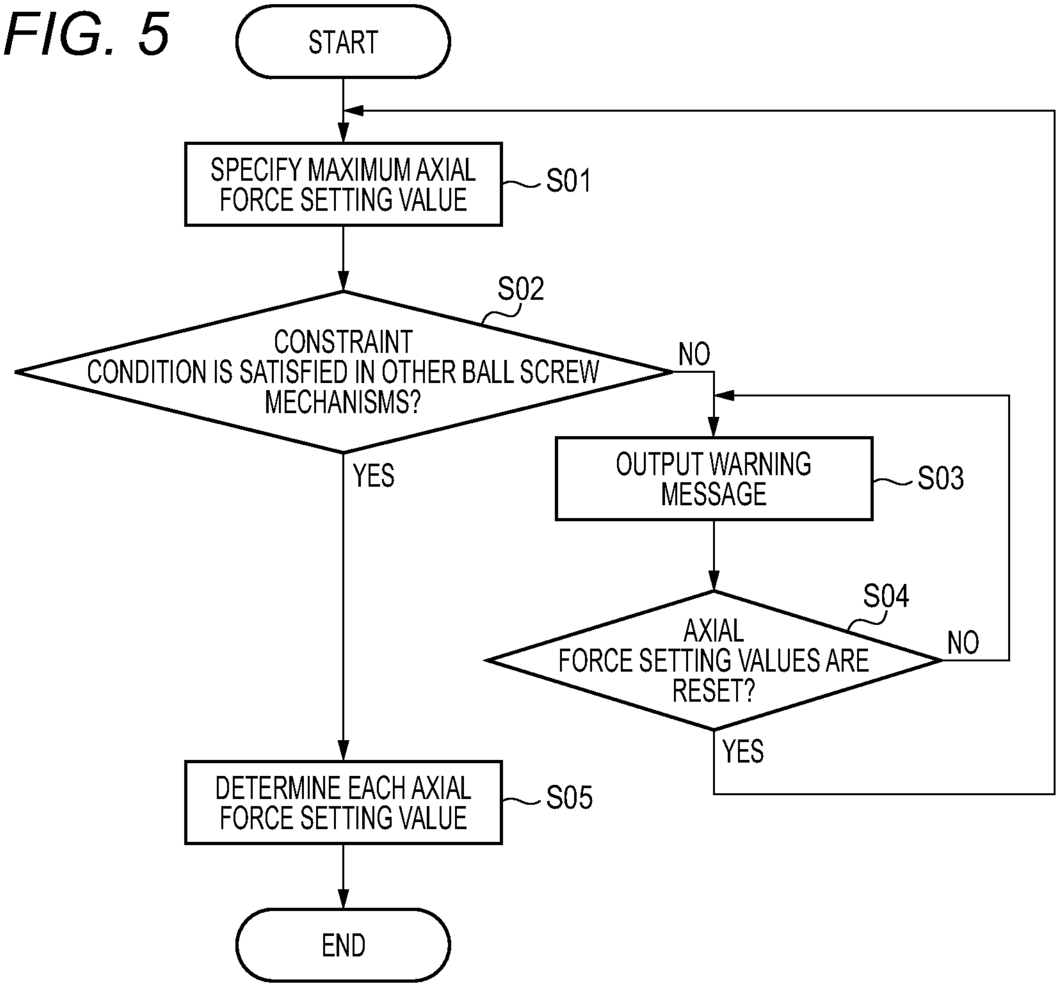
FIG. 5 is a flowchart showing an axial force setting value inspection method according to the present illustrative embodiment.

An operator sets the axial force setting values respectively for the four ball screw mechanisms 18*a*, 18*b*, 18*c*, and 18*d* (see FIG. 3) in the control device 5 (see FIG. 1). Then, the control device 5 confirms whether each of the axial force setting values is appropriate. As shown in FIG. 5, the control device 5 performs step S01 to specify a maximum axial force setting value. That is, among the axial force setting values set for the four ball screw mechanisms 18*a*, 18*b*, 18*c*, and 18*d*, the maximum axial force setting value that is the maximum value is specified. At this time, the ball screw mechanism for which the maximum axial force setting value is set is also specified. For example, when the maximum axial force setting value is set for the ball screw mechanism 18*b*, the ball screw mechanism 18*b* is specified.

Next, the control device 5 performs step S02. That is, it is confirmed whether the constraint condition is satisfied for other ball screw mechanisms 18*a*, 18*c*, and 18*d*. The constraint condition is a condition that defines an allowable range within which the axial force setting values can be set for the ball screw mechanisms 18*a*, 18*b*, 18*c*, and 18*d* when setting the axial force setting values. In the present illustrative embodiment, the constraint condition is a condition that a difference between the maximum axial force setting value and each of the axial force setting values set for the other ball screw mechanisms 18*a*, 18*c*, and 18*d* is equal to or smaller than an allowable difference. This will be described with reference to FIG. 6.

Figure 6:
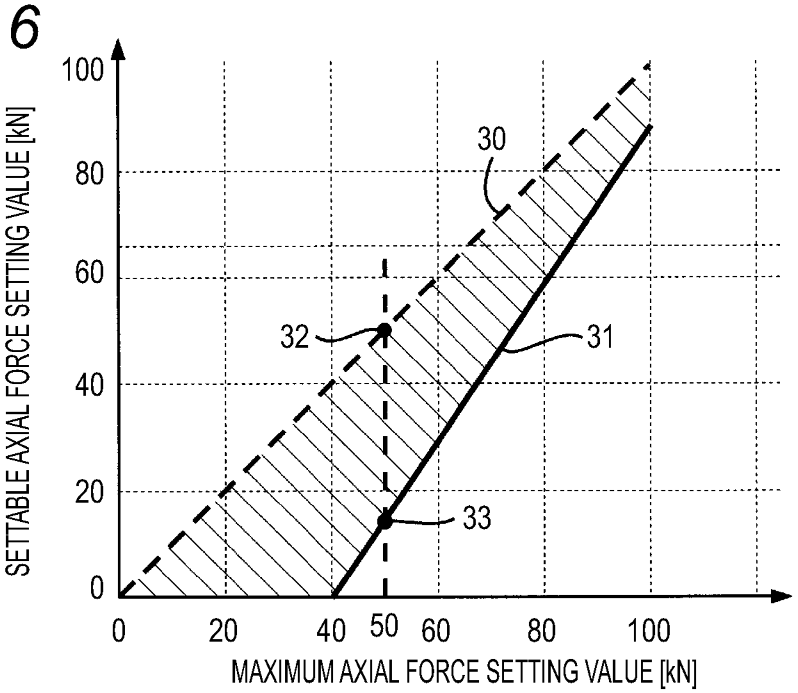
FIG. 6 is a graph showing a constraint condition applied in the axial force setting value inspection method according to the present illustrative embodiment.

In FIG. 6, a horizontal axis represents the maximum axial force setting value, and a vertical axis represents a settable axial force setting value. A graph 30 is a graph showing the maximum axial force setting value. A graph 31 is a graph indicating a lower limit of the settable axial force. For example, when the maximum axial force setting value set in the ball screw mechanism 18*b* is 50 kN, a value (reference numeral 32) in the graph 30 is naturally 50 kN. On the other hand, a value (reference numeral 33) in the graph 31 is 15 kN. That is, the lower limit of the settable axial force is 15 kN. Then, when the maximum axial force setting value is 50 kN, the allowable difference is 35 kN (50 kN−15 kN). Therefore, in step S02, it is confirmed whether the difference between the maximum axial force setting value 50 kN and each of the axial force setting values set for the other ball screw mechanisms 18*a*, 18*c*, and 18*d* is equal to or smaller than the allowable difference 35 kN.

If the constraint condition is not satisfied (NO), step S03 shown in FIG. 5 is performed. In step 503, the control device 5 outputs an alert indicating that the axial force setting value set by the operator cannot be set. Further, magnitude of the deviated axial force is shown for, among the other ball screw mechanisms 18*a*, 18*c*, and 18*d*, the ball screw mechanisms 18*a*, 18*c*, and 18*d* in each of which the difference from the maximum axial force setting value exceeds the allowable difference. The operator can understand the range of the appropriate axial force setting value by looking at the alert, and set the axial force setting value for each of the ball screw mechanisms 18*a*, 18*b*, 18*c*, and 18*d* again. The control device 5 performs step S04 to determine whether the operator has reset the axial force setting values. If the axial force setting values are reset (YES), the process returns to step S01. On the other hand, if the axial force setting values are not reset (NO), the process returns to step S03.

In step S02, if it is determined that the constraint condition is satisfied (YES), step S05 is performed. That is, the axial force setting values set for the four ball screw mechanisms 18*a*, 18*b*, 18*c*, and 18*d* (see FIG. 3) by the operator are determined and stored in the control device 5. The inspection ends.

As is apparent from the graphs 30 and 31 in FIG. 6, regarding the constraint condition according to the present illustrative embodiment, the allowable difference changes depending on the maximum axial force setting value. That is, the allowable difference decreases as the maximum axial force setting value increases.

Modification 1

Figure 7A:
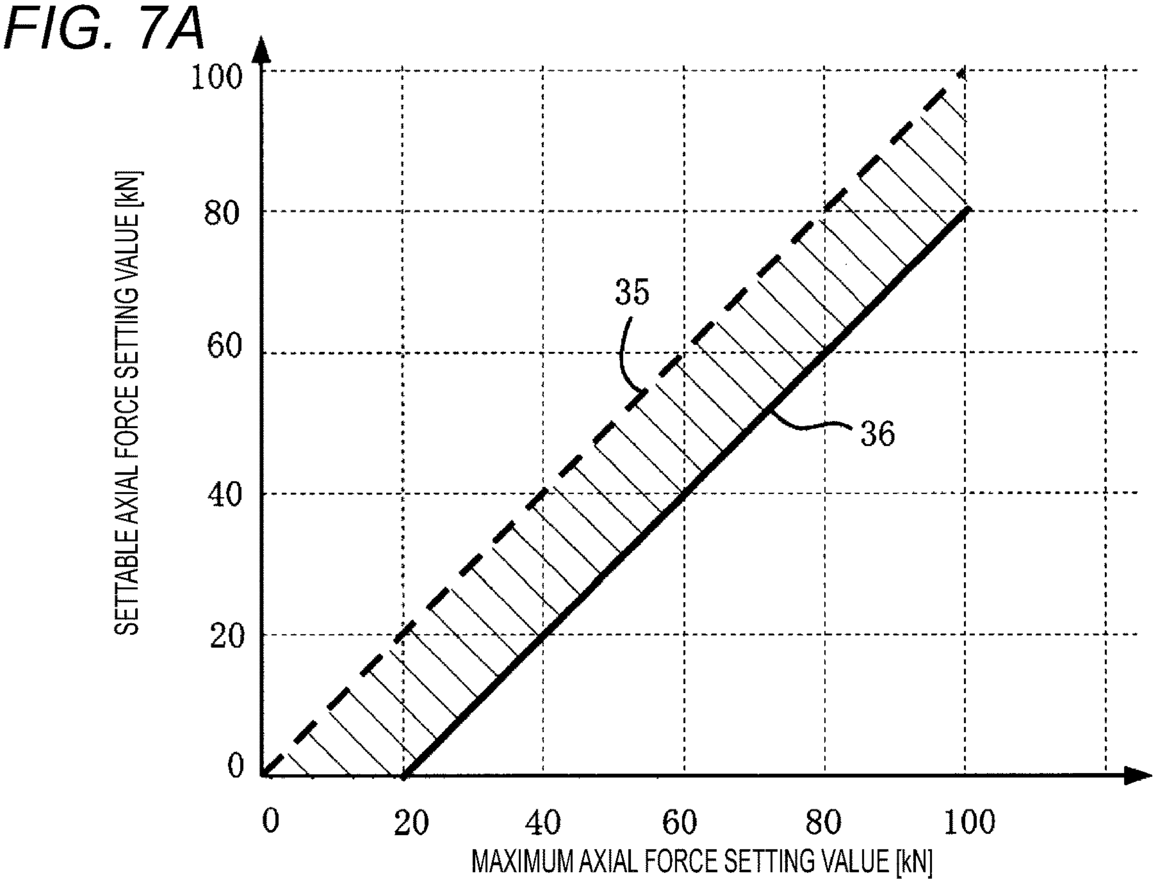
FIG. 7A is a graph showing a constraint condition according to Modification 1.

The constraint condition can be variously modified. FIG. 7A is a graph showing a constraint condition according to Modification 1. In FIG. 7A showing the constraint condition according to Modification 1, a graph 36 indicating the lower limit of the settable axial force is a graph translated downward in the vertical axis direction with respect to a graph 35 indicating the maximum axial force setting value. Under the constraint condition, a difference between the graph 35 and the graph 36 is 20 kN, which is constant. That is, the allowable difference is 20 kN, which is constant. The injection molding machine 1 and the mold clamping device 2 in which the constraint condition according to Modification 1 is adopted are the same as the configurations shown in FIGS. 1 and 2, and the description thereof is omitted.

In the axial force setting value inspection method according to the present illustrative embodiment described with reference to FIG. 5, when the constraint condition according to Modification 1 is adopted, the following is performed in step S02. That is, it is inspected whether the difference between each of the axial force setting values set for the other ball screw mechanisms 18*a*, 18*c*, and 18*d* (see FIG. 3) and the maximum axial force setting value set for the ball screw mechanism 18*b* is within 20 kN.

Modification 2

Figure 7B:
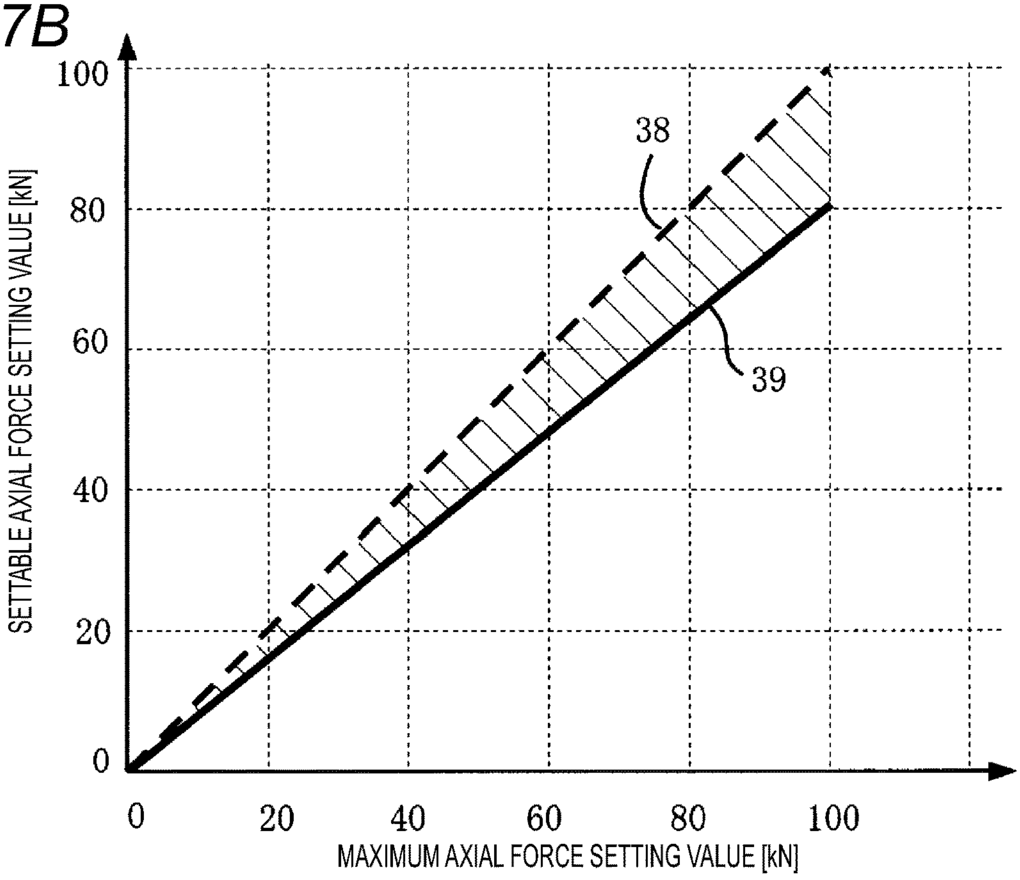
FIG. 7B is a graph showing a constraint condition according to Modification 2.

FIG. 7B is a graph showing a constraint condition according to Modification 2. The injection molding machine 1 and the mold clamping device 2 in which the constraint condition according to Modification 2 is adopted are also the same as the configurations shown in FIGS. 1 and 2, and the description thereof is omitted. Under the constraint condition according to Modification 2, a gradient of a graph 39 indicating the lower limit of the settable axial force is lower than that of a graph 38 indicating the maximum axial force setting value. Under the constraint condition, the allowable difference varies depending on the maximum axial force setting value, and increases as the maximum axial force setting value increases.

Although the invention made by the present inventor has been specifically described above based on the illustrative embodiment, it is needless to say that the present invention is not limited to the illustrative embodiment described above, and various modifications can be made without departing from the scope of the invention. A plurality of examples described above may be implemented in combination as appropriate.

What is claimed is:

1. A mold clamping device comprising:

two mold platens;

a plurality of ball screw mechanisms connecting the mold platens to each other;

a plurality of servo motors respectively provided on the plurality of ball screw mechanisms and configured to respectively drive the ball screw mechanisms; and a control device configured to independently control the servo motors based on a plurality of axial force setting values respectively set for the plurality of ball screw mechanisms, the plurality of axial force setting values being set in the control device based on a constraint condition defining an allowable range within which the axial force setting values are settable, wherein axial force setting values for at least two of the plurality of screw mechanisms are different from each other, wherein the control device is further configured to specify a maximum axial force setting value among the plurality of axial force setting values respectively set for the plurality of ball screw mechanisms.

2. The mold clamping device according to claim 1, wherein when a maximum value among the plurality of axial force setting values respectively set for the plurality of ball screw mechanisms is defined as a maximum axial force setting value, the constraint condition is that a difference between the maximum axial force setting value and each of other axial force setting values is equal to or smaller than an allowable difference.

3. The mold clamping device according to claim 2, wherein the allowable difference varies depending on the maximum axial force setting value.

4. The mold clamping device according to claim 3, wherein the allowable difference decreases as the maximum axial force setting value increases.

5. The mold clamping device according to claim 3, wherein the allowable difference increases as the maximum axial force setting value increases.

6. The mold clamping device according to claim 2, wherein the allowable difference is a constant value regardless of the maximum axial force setting value.

7. The mold clamping device according to claim 2, wherein the allowable difference is set for each of other ball screw mechanisms other than one ball screw mechanism, for which the maximum axial force setting value is set, among the plurality of ball screw mechanisms, and is different for each of the other ball screw mechanisms.

8. An injection molding machine comprising:

an injection device configured to inject an injected material, a mold clamping device configured to clamp a mold, the mold clamping device comprising:

two mold platens;

a plurality of ball screw mechanisms connecting the mold platens to each other; and a plurality of servo motors respectively provided on the plurality of ball screw mechanisms and configured to respectively drive the ball screw mechanisms; and a control device configured to independently control the servo motors based on a plurality of axial force setting values respectively set for the plurality of ball screw mechanisms, the plurality of axial force setting values being set in the control device based on a constraint condition defining an allowable range within which the axial force setting values are settable, wherein axial force setting values for at least two of the plurality of screw mechanisms are different from each other, wherein the control device is further configured to specify a maximum axial force setting value among the plurality of axial force setting values respectively set for the plurality of ball screw mechanisms.

9. The injection molding machine according to claim 8, wherein when a maximum value among the plurality of axial force setting values respectively set for the plurality of ball screw mechanisms is defined as a maximum axial force setting value, the constraint condition is that a difference between the maximum axial force setting value and each of other axial force setting values is equal to or smaller than an allowable difference.

10. The injection molding machine according to claim 9, wherein the allowable difference varies depending on the maximum axial force setting value.

11. The injection molding machine according to claim 10, wherein the allowable difference decreases as the maximum axial force setting value increases.

12. The injection molding machine according to claim 10, wherein the allowable difference increases as the maximum axial force setting value increases.

13. The injection molding machine according to claim 9, wherein the allowable difference is a constant value regardless of the maximum axial force setting value.

14. The injection molding machine according to claim 9, wherein the allowable difference is set for each of other ball screw mechanisms other than one ball screw mechanism, for which the maximum axial force setting value is set, among the plurality of ball screw mechanisms, and is different for each of the other ball screw mechanisms.

15. A mold clamping device comprising:

two mold platens;

a plurality of ball screw mechanisms connecting the mold platens to each other;

a plurality of servo motors respectively provided on the plurality of ball screw mechanisms and configured to respectively drive the ball screw mechanisms; and a control device configured to independently control the servo motors based on a plurality of axial force setting values respectively set for the plurality of ball screw mechanisms, the plurality of axial force setting values being set in the control device based on a constraint condition defining an allowable range within which the axial force setting values are settable, wherein axial force setting values for at least two of the plurality of screw mechanisms are different from each other, wherein the control device is further configured to:

specify a maximum axial force setting value among the plurality of axial force setting values;

determine whether the constraint condition is satisfied for other axial force setting values by comparing a difference between the maximum axial force setting value and each of the other axial force setting values with an allowable difference; and output an alert when the constraint condition is not satisfied.

16. The injection molding machine according to claim 8, wherein the control device is further configured to:

specify a maximum axial force setting value among the plurality of axial force setting values;

determine whether the constraint condition is satisfied for other axial force setting values by comparing a difference between the maximum axial force setting value and each of the other axial force setting values with an allowable difference; and output an alert when the constraint condition is not satisfied.

17. The injection molding machine according to claim 9, wherein the allowable difference varies depending on the maximum axial force setting value.

* * * * *